United States Patent
Dubose

(10) Patent No.: US 10,336,355 B1
(45) Date of Patent: Jul. 2, 2019

(54) STABLY BALANCED WHEELBARROW

(71) Applicant: Derek Dubose, Chico, CA (US)

(72) Inventor: Derek Dubose, Chico, CA (US)

( * ) Notice: Subject to any disclaimer, the term of this patent is extended or adjusted under 35 U.S.C. 154(b) by 0 days.

(21) Appl. No.: 15/992,900

(22) Filed: May 30, 2018

(51) Int. Cl.
*B62B 1/00* (2006.01)
*B62B 1/18* (2006.01)

(52) U.S. Cl.
CPC ................... *B62B 1/186* (2013.01)

(58) Field of Classification Search
CPC .... B62B 1/00; B62B 1/10; B62B 1/18; B62B 1/186
See application file for complete search history.

(56) References Cited

U.S. PATENT DOCUMENTS

| | | | | |
|---|---|---|---|---|
| 392,150 A * | 10/1888 | Fouzer | ................................ | 301/1 |
| 2,893,748 A * | 7/1959 | Coe | .......................... | B62B 1/18 280/47.3 |
| 2,940,770 A * | 6/1960 | Frenz | ........................ | B62B 1/18 188/82.6 |
| 4,190,260 A * | 2/1980 | Pearce | ....................... | B62B 1/18 280/47.31 |
| 5,026,079 A * | 6/1991 | Donze | ....................... | B62B 1/20 280/47.31 |
| 5,074,091 A | 12/1991 | Brouard | | |
| 5,758,887 A * | 6/1998 | Bobst | ......................... | B62B 1/18 280/47.24 |
| 5,884,924 A * | 3/1999 | Fairchild | ................... | B62B 1/18 280/47.31 |
| 6,241,276 B1 * | 6/2001 | Wilburn | .................... | B62B 1/20 280/47.18 |
| 2004/0026898 A1 * | 2/2004 | Tomchak | ................ | B62B 1/206 280/653 |
| 2012/0091674 A1 * | 4/2012 | Kartalopoulos | ........... | B62B 1/18 280/47.26 |
| 2016/0332649 A1 * | 11/2016 | Buttimer | ................... | B62B 3/08 |

* cited by examiner

*Primary Examiner* — Brian L Swenson
(74) *Attorney, Agent, or Firm* — Sanchelima & Associates, P.A.; Christian Sanchelima; Jesus Sanchelima

(57) ABSTRACT

The present invention is a stably balanced wheelbarrow which is easy to use in different ground conditions like un-even terrain or obstacles like stones. Wheelbarrow includes a main frame, a carriage, a wheel and a wheel securing unit. Main frame supports carriage, wheel and wheel securing unit. Carriage can be of any desired shape and holds load/objects. Wheel is made wide enough to provide support to wheelbarrow such that wheelbarrow is stable. Wheel is secured by wheel securing unit. Wheel securing unit includes a pair of flange bearings and spacers. Flange bearings are disposed on either side of wheel and provide frictionless rotation of wheels. Spacers are provided on either side between flange bearings and frame for preventing movement of wheel on axle.

10 Claims, 4 Drawing Sheets

STABLY BALANCED WHEELBARROW

BACKGROUND OF THE INVENTION

1. Field of the Invention

The present disclosure relates to a material handling device propelled manually. More particularly, the present disclosure relates to an improved wheelbarrow which is modified for stable balancing.

2. Description of the Related Art

Wheelbarrow is used since ages in many applications such as in construction industries for handling materials or used for maintaining lawns. Wheelbarrow has one wheel which provides mobility when lifted and pushed by a user. However, conventionally available wheelbarrow has narrow wheels because of which there is unstable movement of wheelbarrow. It is likely that wheelbarrow with such small wheels can topple upside down and scattering material filled therein in surrounding area. To avoid toppling, conventional wheelbarrows are provided with two wheels which provide adequate stability. However, use of two wheels requires more number of bearings and maintenance and cost associated therewith.

Several designs of various wheelbarrow have been designed in the past. None of them, however, include a wide wheel that facilitates stability and flexibility of wheelbarrow.

Applicant believes that a related reference corresponds to US patent application 20120091674 filed by Kartalopoulos Stamatios V. titled 'Self-balancing multifunctional wheelbarrow' disclose a wheelbarrow which is self-balanced by strategically positioning the barrel-shaped wheel under and a little forward the center of gravity of the wheelbarrow. However, the wheelbarrow if not positioned strategically will not provide desired result and hence the manufacturing of wheelbarrow needs to be precisely done which requires skilled labor and consumes man hours to achieve desired.

Another WIPO patent application 2015074091 filed by 'Kong barrow IND PTY LTD. titled 'Improved wheelbarrow structural and container shape to distribute load' discloses a load container having upper region being of a substantial volume relative to lower region and extends across the width of the container for achieving a distribution of load that minimises lift effort whilst maintaining stability in different operational positions. However, to achieve such stability specific shape of load container is desired in which volume of the upper region has is substantially more than that of lower region which can also demand for more usage of material.

Other documents describing the closest subject matter provide for a number of more or less complicated features that fail to solve the problem in an efficient and economical way. None of these patents suggest the novel features of the present invention.

SUMMARY OF THE INVENTION

In view of the above, it is an objective of the present invention to solve or at least reduce the problems discussed above. The present invention is a stably balanced wheelbarrow which is easy to use in different ground conditions like un-even terrain or obstacles like stones. Wheelbarrow includes a main frame, a carriage, a wheel and a wheel securing unit. Main frame supports carriage, wheel and wheel securing unit. Carriage can be of any desired shape and holds load/objects. Wheel is made wide enough to provide support to wheelbarrow such that wheelbarrow is stable. Wheel is secured by wheel securing unit. Wheel securing unit includes a pair of flange bearings and spacers. Flange bearings are disposed on either side of wheel and provide frictionless rotation of wheels. Spacers are provided either side between flange bearings and frame for preventing movement of wheel on axle.

It is one of the main objects of the present invention is to provide an improved wheelbarrow which is stably balance by use of wide wheels.

It is another object of this invention is to provide a wheelbarrow that is flexible and used in different ground conditions.

It is another object of this invention is to provide a wheelbarrow that is easy to operate and reduces spillage/falling of load.

It is another object of this invention is to provide a wheelbarrow that provides stability by use of a single wide wheel.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
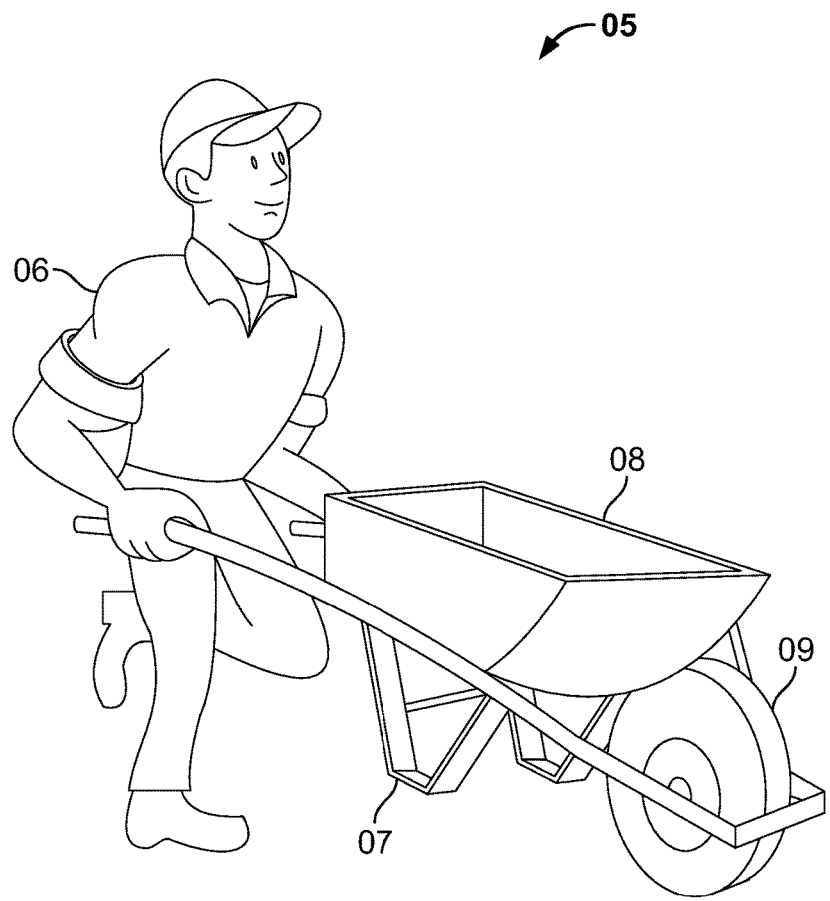
FIG. 1 represents a perspective view of a conventional wheelbarrow in which wheels are narrow in size.
Figure 2:
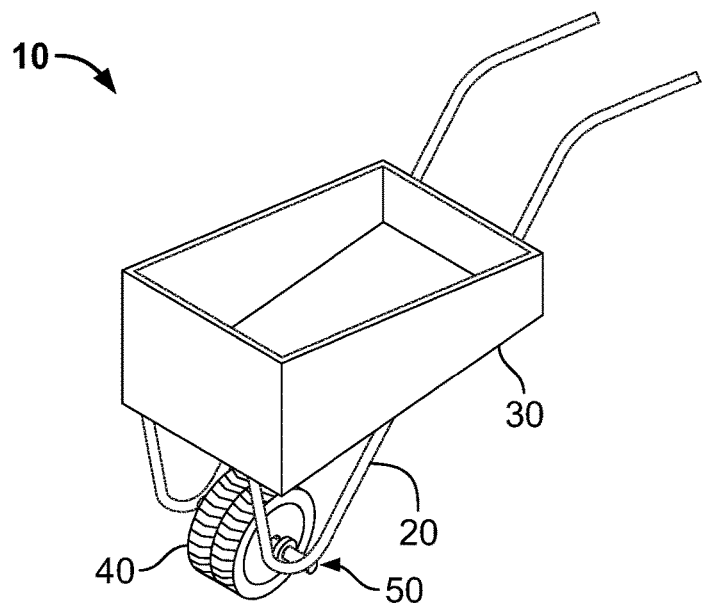
FIG. 2 is a perspective view of a wheelbarrow in which wheels are wide in size, in accordance with one embodiment of the present invention.
Figure 3:
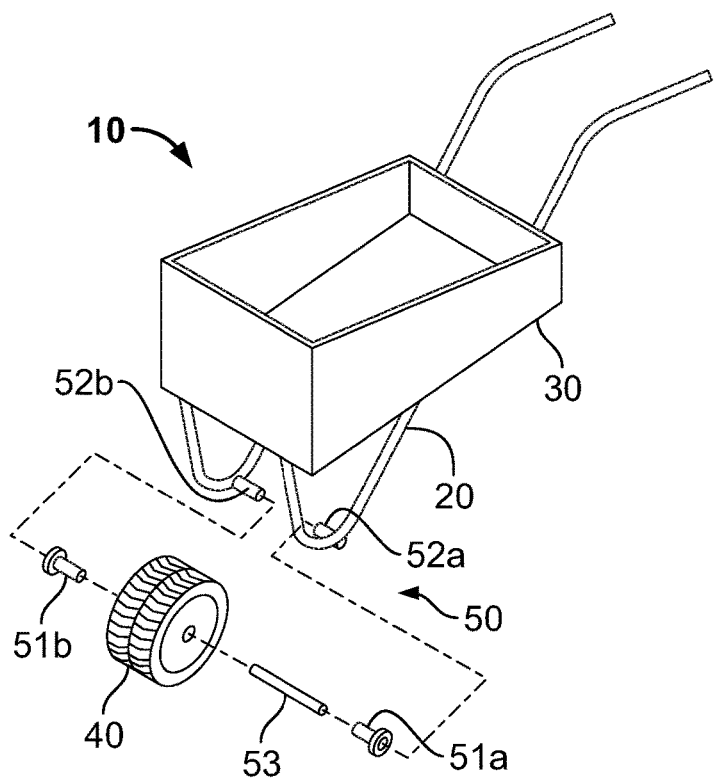
FIG. 3 represents an exploded view of wheelbarrow of FIG. 2.
Figure 4A:
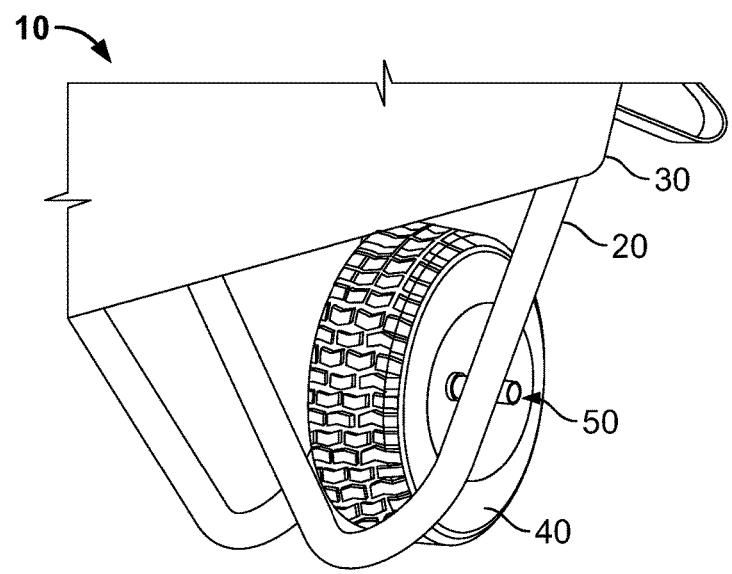
FIG. 4a represents an enlarged view of a portion of wheelbarrow of FIG. 2.
Figure 4B:
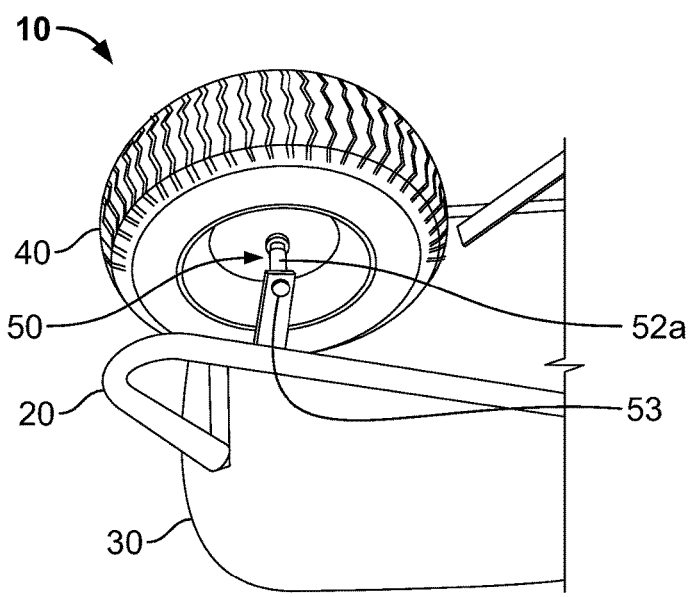
FIG. 4b represents another enlarged view of a portion of wheelbarrow of FIG. 2 positioned upside down.
Figure 5:
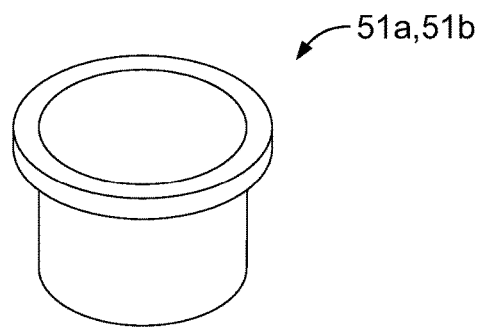
FIG. 5 represents a typical flange used for securing wide sized wheel of wheelbarrow of FIG. 2.
Figure 6:
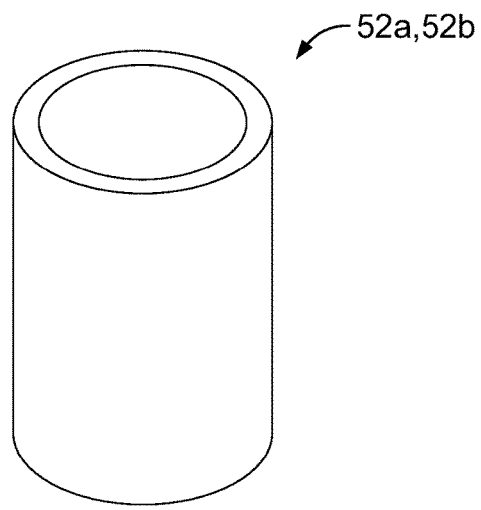
FIG. 6 represents a typical spacer used for securing wide sized wheel of wheelbarrow of FIG. 2.

Referring now to the drawings (FIG. 1), where a conventional wheelbarrow 05 is provided that is pushed by a user 06 and includes a frame 07, a carriage 08 and a narrow wheel 09. Owing to narrow wheel 09, wheelbarrow 05 is un-stable during mobility especially when load/objects in carriage 08 are more. Also, such narrow wheel 09 may not be suitable when terrain is un-even or has more obstacles like stones. Hence, there is a need of a wheelbarrow that alleviates the aforementioned drawbacks.

Referring now to the drawings (FIGS. 2 to 6), where the present invention is generally referred to with numeral 10, it can be observed that a wheelbarrow, in accordance with one embodiment, is provided that includes a main frame 20, a carriage 30, a wheel 40 and a wheel securing unit 50.

Main frame 20 supports various components of carriage 30, wheel 40 and wheel securing unit 50. When wheelbarrow 10 is at rest main frame 20 engages with the ground and thereby provides sufficient support.

Carriage 30 is supported and fixedly connected on main frame 20. Carriage 30 is a load carrying container that receives load/objects and provides adequate support for carrying of load/objects received therewithin at desired locations. Carriage 30 can be of any desired shape and is not dependent on specific type of shape for achieving stability. Carriage 30 can be of any material which can be selected based upon factors like weight carrying capacity, shape of load/objects to be carried, cost of material and like other factors.

Wheel 40 is connected to main frame 20. Size of wheel 40 is wide enough so as to maintain stability of wheelbarrow 10. Moreover, instead of conventional narrow wheel 09, wheel 40 of the present invention is wider and hence provides more stability. Typically, width of wheel 40 is equal to or more than 5 inches so that stability can be achieved. Further, such width can be formed by a single wheel or assembling two small width wheels disposed adjacently with each other. Wheel 40 can be configured with at least one of rib, thread block, grooves, sipes or shoulders so that adequate gripping is achieved in various ground conditions like smooth, uneven or with small obstacles like stones. In one embodiment, wheel 40 is a wheel of a standard riding lawn mower front wheel with rim of size 1.6 inches×6.5 inches–8 inches.

Wheel securing unit 50 secures wheel 40 to main frame 20. Wheel securing unit 50 includes at least a pair of flange bearings 51a and 51b and at least a pair of spacers 52a and 52b. Flange bearings 51a and 51b are inserted in axle 53 such what wheel 40 is positioned therebetween. At least a portion of flange bearings 51a and 51b are inserted in wheel 40 for facilitating frictionless rotation of wheel 40. Spacers 52a and 52b are mounted on axle 53 and on either side of wheel 40 and adjacent to flange bearings 51a and 51b. Spacers 52a and 52b extend towards main frame 20. Size of the spacers 52a and 52b can be varied as per distance between main frame 20 and flange bearings 51a and 51b such that wheel 40 is prevented from any movement of axle 53. Both spacers 52a and 52b can be of same size or one can be smaller than other depending on the need. In one exemplary embodiment, size of flange bearings 51a and 51b are ⅝×¾×1×¾ and size of spacer 52a is ⅝×⅞×2-¼ and size of spacer 52b is ⅝×7/8×¾, wherein sizes are in inches. Spacers are typically made of steel material.

Wheel securing unit 50 with wheel 40 can be easily retrofitted in existing wheelbarrows thus making wheelbarrows more easy to use, stable and reliable. Improvement in wheel securing unit 50 and wheel 40 enables wheelbarrow 10 to be more stable and suitable in variable ground conditions like un-even terrain or ground having obstacles like stones. Owing to wider wheel 40, user/operators fatigue required for maintaining stability is reduced and also due to stability spillage of dropping of load/objects is reduced.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A wheelbarrow, comprising:
a frame supporting a carriage thereon, at least one wheel member mounted between said frame using a wheel securing unit, said frame having lateral portions, said lateral portions each having a bottom end, said wheel securing unit includes, a first and second flange bearing located on either side of an axle, said first and second flange bearing include a cavity, said axle has two opposite distal ends each inserted into a corresponding cavity, said axle inserted through said at least one wheel member and secured to said frame using said first and second flange bearings, said bottom ends include a mounting opening, spacers having a first spacer end and a second spacer end, said first spacer end passed through distal ends of said first and second flange members, said second spacer end passed through said mounting opening and attached to said frame, thereby also connecting said first and second flange, said axle and said at least one wheel member to said frame.

2. The wheelbarrow of claim 1 wherein said carriage is removably mounted to said frame.

3. The wheelbarrow of claim 1 wherein said carriage is integrally mounted to said frame.

4. The wheelbarrow of claim 1 wherein two wheel members and are flush used together to provide greater stability to the wheelbarrow.

5. The wheelbarrow of claim 1 wherein said at least one wheel member includes ribbing, grooves, threads, sipes, or shoulders to enhance gripping.

6. The wheelbarrow of claim 1 wherein wheel securing unit includes at least one spacer mounted to at least one of said bottom end between said frame and said first or second flange bearing.

7. The wheelbarrow of claim 6 wherein said at least one spacer comprises at least two spacers wherein said spacers are the same size.

8. The wheelbarrow of claim 6 wherein said at least one spacer comprises at least two spacers wherein said spacers are different sizes.

9. The wheelbarrow of claim 1 wherein said wheel securing unit is retrofitted into existing wheelbarrows.

10. The wheelbarrow of claim 1 wherein said bottom end includes a female mounting point, said first and second flange bearings include a male mounting member mounted to said female mounting point.

* * * * *